United States Patent
Luo et al.

[11] Patent Number: 6,036,083
[45] Date of Patent: Mar. 14, 2000

[54] METHOD FOR BRAZE FLUX APPLICATION

[75] Inventors: Yang Luo, East Amherst; Hartley F. Hutchins, Lockport, both of N.Y.

[73] Assignee: General Motors Corporation, Detroit, Mich.

[21] Appl. No.: 09/013,376

[22] Filed: Jan. 26, 1998

[51] Int. Cl.[7] .............................. B23K 1/20; B23K 31/02; B05D 1/04
[52] U.S. Cl. ........................ 228/223; 228/183; 228/207; 228/232; 228/233.2; 427/458; 427/475
[58] Field of Search .................... 228/164, 170, 228/207, 223, 183, 262.51, 232; 427/458, 475

[56] References Cited

U.S. PATENT DOCUMENTS

| | | | |
|---|---|---|---|
| 3,667,111 | 6/1972 | Chartet | 29/495 |
| 3,747,199 | 7/1973 | Swaney, Jr. | 29/494 |
| 3,937,387 | 2/1976 | Fletcher et al. | 228/193 |
| 3,963,529 | 6/1976 | Tsunashima | 148/25 |
| 4,774,106 | 9/1988 | Kozono | 427/202 |
| 4,923,110 | 5/1990 | Carmichael et al. | 228/214 |
| 5,016,809 | 5/1991 | Winterbottom et al. | 228/205 |
| 5,174,490 | 12/1992 | Koisuka et al. | 228/183 |
| 5,209,782 | 5/1993 | Morris | 118/603 |
| 5,289,968 | 3/1994 | Maeda et al. | 228/223 |
| 5,322,209 | 6/1994 | Barten et al. | 228/183 |
| 5,431,330 | 7/1995 | Wieres | 228/181 |
| 5,556,023 | 9/1996 | Kuramoto et al. | 228/248.1 |
| 5,820,938 | 10/1998 | Pank et al. | 427/449 |
| 5,857,367 | 1/1999 | Akiyama | 72/42 |

*Primary Examiner*—Patrick Ryan
*Assistant Examiner*—Kiley Stoner
*Attorney, Agent, or Firm*—Patrick M Griffin

[57] ABSTRACT

The forming oil degreasing step and flux coating step are reversed as part of a basic fluxed heat exchanger brazing process. This allows the fluxed parts to be thermally degreased concurrently with the braze oven workpiece preheat process, eliminating a separate degrease step and apparatus entirely. Surprisingly, and contrary to all teaching as to electrostatic dry power coating, powdered flux was found to electrostatically bond to an oily surface as well as, or even better than, an oil free surface.

2 Claims, 1 Drawing Sheet

METHOD FOR BRAZE FLUX APPLICATION

TECHNICAL FIELD

This invention relates to a novel method for applying braze flux coating to brazeable metal workpieces.

BACKGROUND OF THE INVENTION

Methods for brazing together heat exchangers comprised of a plurality of stamped sheet metal constituent parts can be roughly categorized into flux requiring and fluxless methods. Flux, when needed, is a caustic chemical that melts at just below the temperature at which a layer of braze material clad to the surface of the part melts. The melted flux serves both to dissolve, and prevent the further formation of, metal oxide layers on the metal part outer surfaces. The oxides would otherwise prevent the rough wetting and flow of melted braze material into the joint interfaces, without which solid braze seams cannot form. A separate chemical flux application is not needed when either the process used, or the metal material used, or both, do not require it. For example, in so called vacuum brazing, almost all atmospheric gases, including harmful oxygen, are removed from the braze oven, preventing the formation of oxides at braze temperature. Vacuum brazing obviously requires special equipment, and evacuation, by definition, cannot be part of a continuous, flow through brazing process. Moreover, vacuum brazing is really only useful if the metal itself is not one that is particularly prone to oxidation, such as stainless steel, or an alloy of aluminum containing a sufficient percentage of magnesium to inherently scavenge existing oxide layers without the need for chemical flux. Such alloys are not always desirable.

With flow through braze processes, evacuation is not feasible, but an inert atmosphere can be provided continually around the part to exclude most oxygen. Most often, the part is preheated to just below the braze melt temperature in an initial prechamber, in which the atmosphere need not be as strictly controlled, before entering the braze oven proper. Even so, not all oxygen can be excluded, so that a flux layer is needed, both to prevent further oxide formation and to dissolve the existing oxide layers, especially with common aluminum alloys that do not contain magnesium. Two common flux layer application methods are aqueous fluxing, in which a water slurry of flux is applied to the part, which must be oven dried separately before going to braze. More recently, dry surface flux application by electrostatic methods has been used, similar to dry paint powder coating methods. It has also been proposed in U.S. Pat. No. 5,174,490 issued Dec. 29, 1992 to Koisuka et al. to assist the electrostatic flux coating process by water spraying the part first, so that the dry flux powder will stick to the wet surface, in addition to the electrostatic force. The braze oven preheat process is sufficient to dry the lightly wetted part, so that a separate flux dry oven is not needed, as with a flux slurry bath.

Fluxing and brazing must also take into account the fact that formed metal parts, especially stamped aluminum alloy parts, are invariably stamped with a suitable lubricating oil or grease, a film of which adheres to the metal surfaces after stamping. Several processes exist for removing the forming oil residue, including solvent baths and vapors, or aqueous wash, which is environmentally preferable. With fluxless brazing processes, it has been recognized that so called thermal degreasing of the surfaces is possible instead of solvent or water wash. In thermal degreasing processes, the oil covered part is heated sufficiently to remove the surface oil, either by volatilization or, reduction with a reactive atmosphere. For example, in U.S. Pat. No. 3,747,199 issued Jul. 24, 1973 to Swaney, Jr., it is recognized that with a magnesium containing aluminum alloy, which is also vacuum brazed, the evacuated preheat chamber alone will successfully clean the part oil film, since the heat and vacuum cooperate to both evaporate the oil film and transport its vapor out of the prechamber. U.S. Pat. No. 5,016,809 issued May 21, 1991 to Winterbottom et al. teaches a separate thermal degreasing step, not in the preheat chamber itself, but in a special reactive atmosphere of oxygen, ammonia or hydrogen, and at a temperature low enough to actually preserve a metal oxide layer containing the necessary magnesium. Again, a flux layer is not used if needed.

In the case of stainless steel parts, which are vacuum brazed without flux, it is difficult to pre-clad the entire surface with a layer of braze material, as with aluminum alloy sheet. Instead, an adhesive tape of braze material is generally pre-applied directly to the joints when the constituent metal parts are fixtured, prior to brazing. As an alternate to the adhesive braze tape, a very complex process has been proposed to actually use some of the residual forming oil film as part of an effectively adherent layer at the joints to retain braze powder. In U.S. Pat. No. 5,431,330 issued Jul. 11, 1995 to Wieres, the oil covered part is heated at a precisely control temperature range to remove only its more volatile constituents, while leaving the heavier, and presumably more viscous, components, as a residue. Then, as the part cools to a defined residual temperature well above room temperature, the part with viscous oil residue is swabbed with a dilute aqueous surfactant solution of citric acid and detergent. Following this, the part is reheated to another controlled temperature range and dried in an air flow. This precisely controlled heating, swabbing, reheating and air drying process is claimed to form a composite sticky film concentrated at the joints. Then, the part is physically dipped into a supply of nickel based brazing powder with a controlled grain size, some of which adheres to the sticky layers. A separate adhesive layer can be sprayed over the adhering powder layer, as well. Finally, the part with its adherent nickel powder layer is brazed which, for stainless, would be a vacuum brazing process again, without the need for flux. There is no teaching in the patent about flux coating, of course, since the process is fluxless. There is also no suggestion that the part with its sticky composite layer of oil residue and soap surfactant could be electrostatically coated with brazing material powders, nor would such a suggestion be expected, because of what the prior art teaches about electrostatic powder coating in general, described in more detail below In the past, flux coating of aluminum alloy sheet stamped parts has been by processes other than electrostatic powder coating. The clear teaching of the prior art is that all forming oil film residue must be removed before the flux is applied. For example, in U.S. Pat. No. 4,923,110 issued May 8, 1990 to Carmichael et al., which claims a process for using protective flux coatings, it is recited that "The mating surfaces of the components . . . are initially cleaned by known cleaning process, which may include chemical and/or mechanical cleaning, to remove all dirt, grease, oil, oxides, moisture, and other oxides therefrom". This is inherently obvious for all water based or water assisted flux application processes, since oil and water are proverbially incompatible. But even in U.S. Pat. No. 3,667,111 issued Jun. 6, 1972 to Chartet, which claims a process for application of an anhydrous (dry) flux at high heat, it is recited that the parts "must obviously be free of all direct, particularly traces of grease, which would risk spoiling the quality of the brazing joints." Interestingly enough, the teaching of U.S. Pat. No. 3,747,199, that in fluxless brazing, the degreasing step could be delayed until the preheat stage, seems to have been less than universally recognized, and the patent has not, as of this writing, even been cited in any later patent. The later U.S. Pat. No. 3,937,387 issued Feb. 10, 1976 to Fletcher et al., which claims a method of fluxes brazing, says that "In preparing the aluminum containing surfaces or parts for fluxes brazing and or diffusion bonding, the surfaces to be welded must first be thoroughly cleaned to remove all grease and the aluminum oxide coating."

A newer dry flux coating process of recent interest is electrostatic powder coating. Electrostatic coating for paint and clear coat powders has been widely used for perhaps twenty years, and there is a great deal of existing literature describing how it should be done. In general, a cleaned metal part capable of being electrically grounded is exposed to a cloud of electrically charged particles, either sprayed from a gun or suspended in a fluidized bed. The process has been slower to gain acceptance in applying powdered fluxes, because their heavier and smaller grain size makes them more difficult to spray or fluidize than paint particles. Also, the economic incentive to switch from conventional wet slurry and drying oven systems to dry electrostatic powder fluxing systems is not that high, since the only equipment and step eliminated thereby is the wet flux dry oven. With either system, the parts, according to conventional teaching, must still be thoroughly and rigorously cleaned first, by whatever cleaning process, to remove all oil residue. The conventional wisdom is that the oil cleaning step cannot possibly be delayed until the braze preheat chamber, as with fluxless vacuum brazing, since the part must be fluxed first, and cleaned of oil first.

Again, if there is one recurrent theme with electrostatic dry coating of any powder, it is the absolute necessity for initial part surface cleaning of all contaminants, and especially of oil and grease film. As to electrostatic flux powder coating specifically, an abstract from the February 1996 issue of *Aluminum Today*, describes the use of an electric thermal degreasing oven to render the surface suitable for flux coating. A dry oil cleaning step is simply substituted for aqueous wash. As to electrostatic application of any dry powder in general, the teaching is just as clear. In the October 1997 issue of *Products Finishing* magazine, a powder coating clinic teaches regarding clear coating aluminum that "The key word here is 'bare.' You must have a surface that is completely free of both organic (dirt and oils) and inorganic (oxides) soils." A Society of Manufacturing Engineers training course on the "Fundamentals of Powder Coating" teaches that "A system for the application of powder is comprised of a pretreatment process (usually a spray washer) . . . ." Another SME publication, "User's Guide to Powder Coating," states that "Considering all key elements involved in a high quality powder-coated product, one truly stands alone—cleaning" (emphasis as in original). This last statement says it best. The one universally perceived truism for electrostatic dry powder coating is that the surface must be absolutely clean first, and especially clean of oil residue, and no one skilled in the art would think to violate that near taboo.

SUMMARY OF THE INVENTION

A brazing flux application method in accordance with the present invention is characterised by the features specified in claim 1.

Despite the universal proscription highlighted above against electrostatically powder coating an oily surface in general, and specifically against flux coating an oily surface to be brazed, the method of the subject invention does exactly that. The still oily surface of the stamped aluminum alloy parts is electrostatically coated with powdered flux first, prior to degreasing. Surprisingly, the flux application works as well, an apparently even better than, as it does on a clean, bare surface, for unknown reasons. The forming oil used is a standard oil suitable for thermal degreasing, thereby allowing the fluxed part to be thermally degreased in the braze preheat chamber, in which the part is raised through a temperature high enough to boil away and vaporize the lubricant. Rather than evacuation or a reactive atmosphere, as is taught by known methods of thermal degreasing prior to fluxless braze, the preheat chamber disclosed uses a non reactive gas atmosphere, such as nitrogen, thereby allowing flow through processing, but preventing the vaporizing lubricant from cracking or oxidizing. The electrostatic coating apparatus, preheat chamber, and braze furnace are all conventional apparatuses, operated at conventional temperatures and in the usual way. However, by reversing the fluxing and oil cleaning steps, a separate, precleaning step and apparatus is eliminated completely, substantially cutting cost and cycle time.

BRIEF DESCRIPTION OF THE DRAWINGS

These and other features of the invention will appear from the following written description, and from the drawings, in which.

DESCRIPTION OF THE PREFERRED EMBODIMENT

Figure 1:
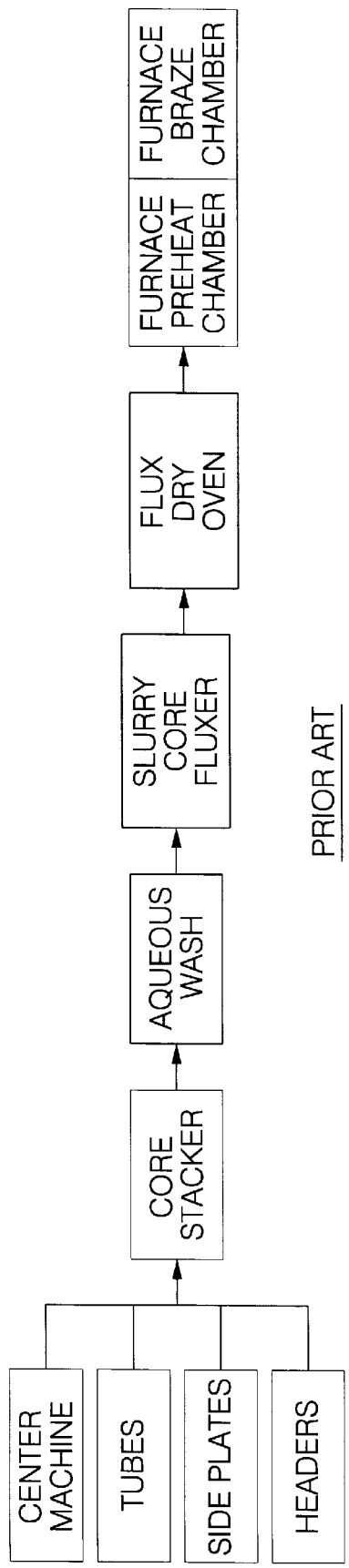
FIG. 1 is a diagrammatic representation of the apparatus and ordered steps of a prior art fluxing and brazing process used to make heat exchangers.

Referring first to FIG. 1, the currently used process is similar to that described above. Various components of a heat exchanger, including air centers (corrugated fins), tubes, side plates and header tanks, are all stamped or rolled from a suitable aluminum alloy. A suitable aluminum alloy here would be one that can be easily formed, and which one does not contain significant amounts of magnesium. Typically, those ones of the constituent parts that are most amenable to cladding will contain a surface coat of a suitable braze material, which has a predetermined melt temperature. The parts most suitable for braze cladding are those that are stamped or formed from sheet stock, such as fins and slotted header plates, rather than those that are hot extruded from billet stock, such as tubes and tanks. All such stamped or formed parts will also, however, have a residue of a forming oil or lubricant necessary to the stamping and forming process. These parts are fixtured in a core stacker, and then go to an aqueous wash for removal of the oil film. Oil removal could also be done with solvents, chemical etching, a separate electric thermal oven, or any other known means. Next, the cleaned, fixtured part is run through a slurry fluxer, leaving a fairly thick, wet coat of flux on its surface, which is then dried in a flux oven. From there, the part is conventionally brazed in a typical controlled atmosphere brazing (CAB) apparatus. If fluxing were done electrostatically and dry, then the slurry fluxer and dry oven together would be replaced by an electrostatic fluxer, but the aqueous prewash or other cleaning step and apparatus would not be eliminated.

Figure 2:
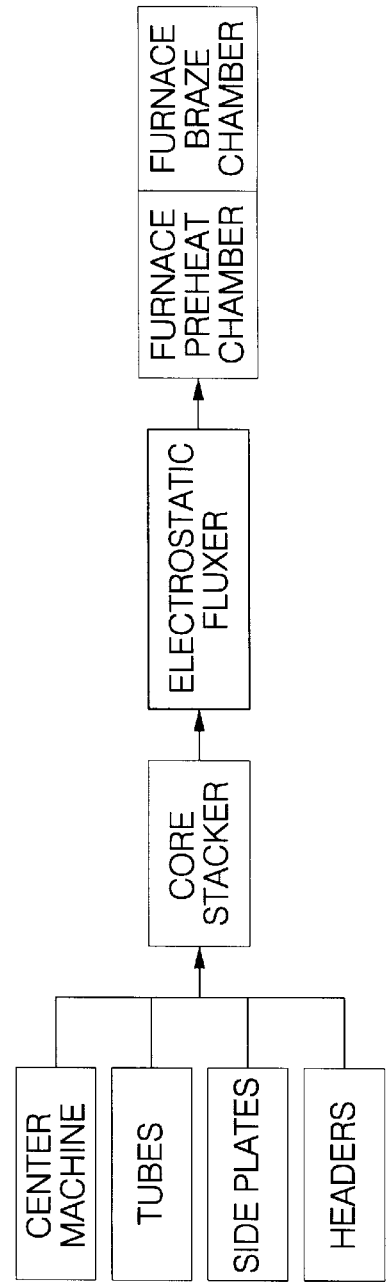
FIG. 2 is a diagrammatic representation of the apparatus and differently ordered steps of the fluxing and brazing process of the invention.

Referring next to FIG. 2, according to a preferred embodiment of the invention, the same constituent parts, with the same aluminum alloy, are stamped and formed in the same way, but with a particular forming lubricant chosen for its ability to be thermally degreased. While neither the lubricant itself, nor its ability to be thermally cleaned, is new, the point in the process in which that is done is completely counter intuitive. Specifically, the lubricant used is designated as DL-485 draw-lube oil, sold by Circle-Prosco, Inc., and advertised as a thermally removable oil. Its recommended temperature for thermal cleaning is around 445 degrees F. In general, one practicing the process of the invention would first choose a thermally degreaseable forming oil whose boiling or vaporization point was well below the flux melt temperature, which would likely be true for any commercially available thermally removable oil and flux, regardless.

Having so chosen the oil and used it to form the parts, the next step is the typical one of fixturing or "core stacking" the parts by clamping into an intermediate assembly, complete in shape and construction to the final product, but for the formation of the braze seams that hold the parts together. Literally nothing is done differently up until this point, but for the choice of a thermally cleanable oil, which itself is not new oil per se. What is totally new is that next, without degreasing first, the intermediate stacked assembly is electrostatically coated with a conventional flux powder. The flux powder used in this case is a fluoride based flux sold under the trade name "Nocolok®", very well known to those skilled in the art. This has a melt temperature of approximately 1040–1060 degrees F, well above the oil's boiling point, and this relative comparison should be true for most commercially available thermally cleanable lubricants and brazing fluxes. The electrostatic coating process is done conventionally, as well, but for the fact that the workpiece is still oil covered. It is grounded, and then exposed to a fluidized bed of dry flux powder. More energy is needed for this fluidized bed, as compared to lighter, larger grained paint powders, but the process is not qualitatively different. If desired, the powder could likely be electrostatically sprayed from a charging gun, as well, although a paint powder spraying system might well have to be modified to handle the heavier, smaller grained, and more abrasive flux grains. Surprisingly enough, the process works, in complete contravention to the almost cardinal rule of "clean first" noted above. The flux powder adheres adequately to the workpiece surface, in spite of its oily residue. Even more surprisingly, the process appears to work better, in the sense that lower flux loadings, in terms of grams per meter squared, have been found to give adequate braze joints. Whereas a typical flux loading of around 5 grams per meter squared would have been considered necessary, here, lighter loadings of less than half that amount have been found to be adequate. The reason for this is not understood at this point. The oil film residue may be directly improving the electrostatic retention process itself somehow, or it may provide additional retention force of the flux powder to the surface mechanically. Whatever the mechanism at work, the flux usage savings alone would be considered very significant. The far larger savings comes later, at the point at which, and in the way in which, the degreasing of the already fluxed workpiece is accomplished.

After fluxing, the still oily, room temperature workpiece is sent directly to the conventional preheat chamber of the braze oven. The braze oven here is the continuous flow, controlled atmosphere type, which allows for a more rapid through put than the older vacuum assisted, batch processing. The parts run through on a conveyer belt, passing through a flexible curtain that retains a constantly replenished, non-reactive atmosphere of nitrogen gas inside the prechamber and oven proper. The nitrogen atmosphere can be more rigorously maintained in the deeper reaches of the oven, where brazing actually occurs, than it can in the prechamber, which is more directly exposed to the outside, and is used just for preheat. There, just as in conventional processing, the workpiece temperature is elevated continuously and gradually, sometimes step wise as the parts move along, to a preheat temperature just below the flux melt temperature. The basic purpose for this is to initially heat the workpiece to a point where flux melt and braze melt can occur sequentially and quickly soon after the part enters the braze oven itself with its more controlled atmosphere. As disclosed, the temperature reached in preheat is in the range of 600 to 1000 degrees F., not far below the flux melt temperature, but well above the boiling or evaporation point of the forming oil residue. As a consequence, thermal degreasing occurs inside the preheat chamber as well, within the usual cycle time, and essentially for free. The conventional preheat temperature is sufficiently high to accomplish the degreasing, and the non-reactive nitrogen atmosphere that is already present prevents the oil vapor from cracking or oxidizing. It can then be pulled out of the preheat chamber by any suitable exhaust means, and potentially even recondensed and reused. Combustion product exhaust fumes are avoided.

Next, the workpieces, oil free but with a preheated flux layer still in place, enter the innermost furnace braze chamber, reaching a further temperature in the range of 1090 to 1120 degrees F., more than sufficient to melt the flux first, and then to melt the braze layer soon after. The flux on the preheated part liquefies and flows over the metal surfaces, cleaning the oxide layers and scavenging any oxygen contamination present to allow thorough wetting and flow by the melted braze layer into the surface interfaces, such as tube the header slot joints, where braze seams are needed. As the workpieces are removed and cooled, the braze seams at the joints solidify. Testing has shown that the seams form adequately, proving that the flux loading and adhesion was adequate, as well. Thus, by being able to delay the thermal degreasing step until after fluxing, the preheat step can be used to do the delayed degreasing, saving the cost and energy of an earlier thermal degreasing with a separate, dedicated oven. This is a very significant energy and cycle time savings, previously feasible only with fluxless, vacuum brazing processes as discussed above.

Variations in the apparatus disclosed could be made. For example, the thermal degreasing need not be done as a brazing preheat step in a braze oven preheat chamber, nor even maintained at a preheat temperature before going to the braze oven. Just thermally degreasing after, rather than before, the electrostatic fluxing step per se is novel, and has some advantage in and of itself. However, much of the advantage of the process would be lost if the thermal degreasing step was only that, with the part being allowed to cool first before it went to the braze oven. The big energy advantage is in combining thermal degrease and preheat, and in maintaining the preheat temperature before brazing, not just in reversing the flux and thermal degrease steps. Then, the braze furnace preheat chamber need only be modified to allow for oil vapor recovery, but is used in the same fashion otherwise. Other oils and fluxes could be used, so long as the oil was one that would boil or vaporize at a temperature comfortably below the flux melt temperature. Other oils and other flux powders might be found, with further experimentation, to be more or less compatible than the two specific ones disclosed here, and alternate choices therefor might become clear if and when the actual mechanism of cooperation between the oil film and electrostatic powder coating is better understood.

We claim:

1. A method for brazing together formed workpieces the outer surfaces of which are coated with a forming lubricant, said workpiece surfaces also having an oxidizable outer surface clad with a layer of brazing material that melts at a predetermined braze temperature, and in which a meltable, oxide removing flux material is applied to the workpiece surface, which flux material melts at a predetermined flux melt temperature lower than said braze temperature, comprising the steps of:

choosing a forming lubricant having an evaporation temperature less than said flux melt temperature;

electrostatically applying said flux material to said lubricant coated metal workpiece surface at a temperature below said lubricant evaporation temperature;

heating said fluxed metal workpieces continuously from a temperature below said lubricant evaporation temperature to and through said evaporation temperature to a temperature above said evaporation temperature, but less than said flux melt temperature, thereby vaporizing said forming lubricant coating, but leaving said flux material on said workpiece surface; and, heating said fluxed but lubricant free workpiece continuously to and through said flux melt temperature and to said braze melt temperature, thereby melting said flux and brazing material.

2. A method for brazing together formed workpieces according to claim 1, further characterised in that:

said fluxed metal workpieces are heated to and through said evaporation temperature and to a preheat temperature above said evaporation temperature, but below said flux melt temperature, and maintained at that preheat temperature before being heated further to and through said flux melt temperature and to said braze melt temperature.

* * * * *